United States Patent
Kwong et al.

(10) Patent No.: US 10,080,036 B2
(45) Date of Patent: Sep. 18, 2018

(54) METHOD AND APPARATUS FOR DEPTH VIDEO CODING USING ENDURABLE VIEW SYNTHESIS DISTORTION

(71) Applicant: City University of Hong Kong, Kowloon (HK)

(72) Inventors: Sam Tak Wu Kwong, QuarryBay (HK); Yun Zhang, Shenzhen (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 744 days.

(21) Appl. No.: 13/895,706

(22) Filed: May 16, 2013

(65) Prior Publication Data

US 2014/0340478 A1 Nov. 20, 2014

(51) Int. Cl.
*H04N 19/103* (2014.01)
*H04N 19/597* (2014.01)
*H04N 19/147* (2014.01)
*H04N 19/19* (2014.01)

(52) U.S. Cl.
CPC ......... *H04N 19/597* (2014.11); *H04N 19/103* (2014.11); *H04N 19/147* (2014.11); *H04N 19/19* (2014.11)

(58) Field of Classification Search
CPC .................................................. H04N 19/597
See application file for complete search history.

(56) References Cited

U.S. PATENT DOCUMENTS

| 6,195,388 B1 * | 2/2001 | Choi ................. H04N 21/23655 375/240.03 |
| 2007/0009026 A1 * | 1/2007 | Kwon ................... H04N 19/176 375/240.03 |
| 2007/0109409 A1 | 5/2007 | Yea et al. |
| 2010/0231688 A1 | 9/2010 | Park et al. |
| 2010/0239180 A1 | 9/2010 | Yea et al. |

(Continued)

FOREIGN PATENT DOCUMENTS

| CN | 101166282 A | 4/2008 |
| CN | 102017627 A | 4/2011 |

(Continued)

OTHER PUBLICATIONS

C. Fehn. "Depth-Image-Based Rendering (DIBR), Compression and Transmission for a New Approach on 3D-TV," in Proc. SPIE Stereoscopic Displays and Virtual Reality Systems XI, Proc. of SPIE-IS&T Electronic Imaging, SPIE vol. 5291, pp. 93-104. 2004.

(Continued)

*Primary Examiner* — Dave Czekaj
*Assistant Examiner* — Berteau Joisil
(74) *Attorney, Agent, or Firm* — Amin, Turocy & Watson, LLP

(57) ABSTRACT

The disclosed subject matter provides depth video coding using endurable view synthesis distortion (EVSD). In particular, a distortion estimator component receives at least one parameter associated with at least one image capturing device and generates a distortion value based on the at least one parameter. An encoder component encodes a multiview input stream based at least in part on the distortion value. As such, compression of depth information can provide for reduced bandwidth consumption for dissemination of encoded multiview content for applications such as 3D video, free viewpoint TV, etc.

20 Claims, 13 Drawing Sheets

(56) References Cited

U.S. PATENT DOCUMENTS

| | | | |
|---|---|---|---|
| 2010/0284466 A1 | 11/2010 | Pandit et al. | |
| 2011/0273529 A1 | 11/2011 | Lai et al. | |
| 2011/0292043 A1* | 12/2011 | Kim | H04N 13/0011 |
| | | | 345/419 |
| 2012/0229602 A1 | 9/2012 | Chen et al. | |
| 2013/0342644 A1* | 12/2013 | Rusanovskyy | H04N 19/597 |
| | | | 348/43 |
| 2014/0098189 A1* | 4/2014 | Deng | H04N 13/0048 |
| | | | 348/43 |

FOREIGN PATENT DOCUMENTS

| | | |
|---|---|---|
| CN | 102769746 A | 11/2012 |
| EP | 2061005 A2 | 5/2009 |
| EP | 2266322 A2 | 12/2010 |
| EP | 2429191 A1 | 3/2012 |
| EP | 2499811 A1 | 9/2012 |
| WO | 2012060156 A1 | 5/2012 |

OTHER PUBLICATIONS

Zhao, et al. "Dept No-Synthesis-Error Model for View Synthesis in 3-D Video,"IEEE Trans. Image Process., vol. 20, No. 8, pp. 2221-2228, Aug. 2011.

K. Muller, et al. "3-D Video Representation Using Depth Maps," Proc. IEEE, vol. 99, No. 4, pp. 643-656, Apr. 2011.

M. Tanimoto, et al. "Improvement of Depth Map Estimation and View Synthesis," International Organisation For Standardisation, Coding of Moving Pictures and Audio, ISO/IEC JTC1/SC29/WG11, M15090, Antalya, Turkey, Jan. 2008, 9 pages.

H. Yuan, et al. "Model Based Joint Bit Allocation Between Texture Videos and Depth Maps for 3D Video Coding," IEEE Transactions on Circuits and Systems for Video Technology, vol. 21, No. 4, pp. 485-497, Apr. 2011.

K. Takagi, et al. "A Study on Rate Distortion Optimization Scheme for JVT Coder," Visual Communications and Image Processing(VCIP), vol. 5150, 2003, pp. 914-923.

Lee, et al. "A Fast and Efficient Multiview Depth Image Coding Method Based on Temporal and Inter-View Correlations of Texture Images," IEEE Trans. Circuits Syst. Video Technol., vol. 21, No. 12, pp. 1859-1868, Dec. 2011.

V.A. Nguyen, et al. "Efficient Techniques for Depth Video Compression Using Weighted Mode Filtering," IEEE Trans. Circuits Syst. Video Technol., 2012, DOI 10.1109/TCSVT.2012.2203212 (to appear), 13 pages.

K.J. Oh, et al. "Depth Coding Using a Boundary Reconstruction Filter for 3-D Video Systems," IEEE Trans. Circuits Syst. Video Technol., vol. 21, No. 3, Apr. 2011, pp. 350-359.

* cited by examiner

METHOD AND APPARATUS FOR DEPTH VIDEO CODING USING ENDURABLE VIEW SYNTHESIS DISTORTION

TECHNICAL FIELD

The various embodiments of the subject disclosure relate generally to video coding, e.g., to depth video coding using endurable view synthesis distortion.

BACKGROUND

Multiview Video Coding (MVC) is an amendment to the H.264/Moving Picture Experts Group-4 (MPEG-4) Advanced Video Coding (AVC) video compression standard developed with joint efforts by MPEG/Video Coding Experts Group (VCEG) that enables encoding on a video stream of frame sequences captured contemporaneously from two or more cameras. MVC can be used for encoding stereoscopic video, free viewpoint television (FTV), multi-view three-dimensional (3D) video, etc. An MVC stream is generally backward compatible with H.264/AVC, which allows older devices and software to decode multiview video coded streams by employing only content associated with a first camera view and ignoring any additional information associated with other camera views.

As an overview, multiview video can capture a scene from two or more viewpoints resulting in high levels of statistical dependencies between groups of pictures (GOPs) from each view. Similarly, within a GOP for a single view, there can be high levels of intra-view statistical dependencies that would be common for coding a conventional single camera stream. Typically, a frame from a first camera view can be predicted not only from temporally related frames from the same camera view, but also from the frames of neighboring cameras with alternate camera views. This can be commonly referred to as prediction from a matrix of pictures (MOP). The MOP is commonly 'n' views by 'k' frames, e.g., each group of pictures has k frames contemporaneously captured by n camera views resulting in n groups of pictures. As an example, a 3×30 MOP can have three GOPs, wherein each GOP has 30 frames. As such, MVC is commonly associated with large quantities of data. Therefore, improvements in compression techniques and/or coding techniques would therefore help to reduce the bandwidth requirements for transmitting a coded video stream.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

An embodiment of the presently disclosed subject matter can include a system that facilitates depth video coding based on endurable view synthesis distortion. The system can include a distortion estimator component and an encoder component. The distortion estimator component receives at least one parameter associated with at least one image capturing device and generates a distortion value based on the at least one parameter. The encoder component encodes a multiview input stream based at least in part on the distortion value.

In another embodiment, the disclosed subject matter can be in the form of a method. The method can include receiving, by a system including a processor, an encoder facilitating encoding of a multiview input stream. The method can further include receiving, by the system, a distortion value generated based on at least one parameter associated with at least one image capturing device. Furthermore, the method can include encoding, by the system, the multiview input stream based at least in part on the distortion value and the encoder.

In an additional embodiment, the disclosed subject matter can be a system having a means for receiving an encoder facilitating encoding of a multiview input stream, means for receiving a distortion value generated based on at least one parameter associated with at least one image capturing device, and means for encoding the multiview input stream based at least in part on the distortion value and the encoder.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

DETAILED DESCRIPTION

Figure 1:
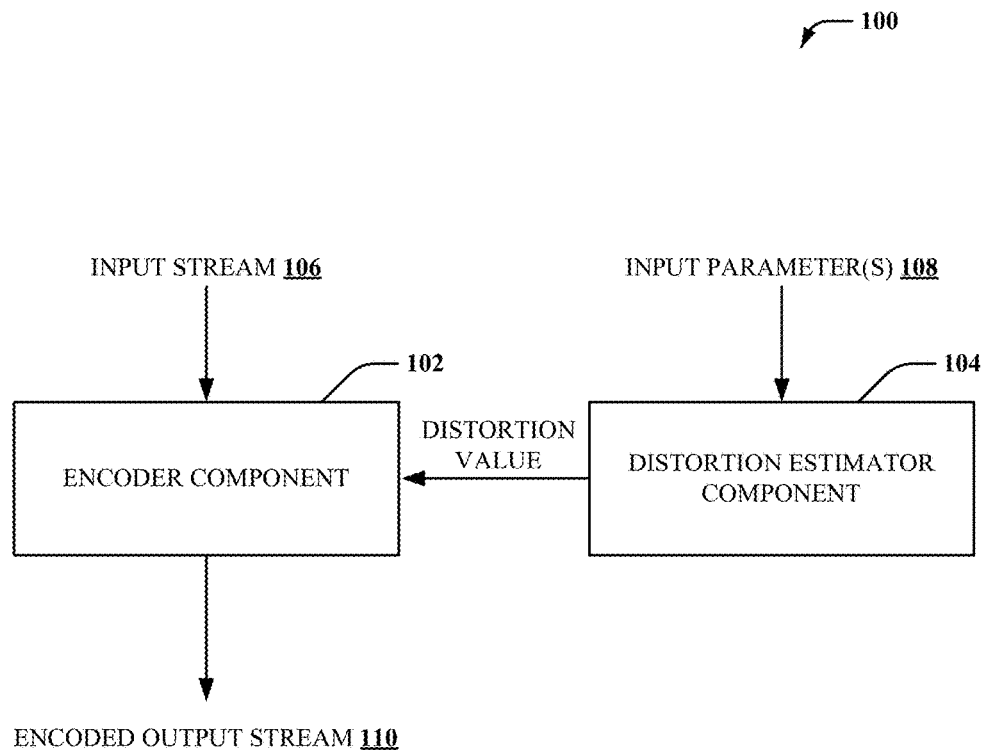
FIG. 1 is a diagram of a system that can facilitate depth video coding based on a distortion value in accordance with an aspect of the subject matter disclosed herein.

The presently disclosed subject matter provides for multiview video coding of depth frames (e.g., depth video coding) using endurable view synthesis distortion (EVSD). Multiview video coding (MVC) can include encoding video frames, e.g., frames from one or more group of pictures (GOPs). Video frames can generally embody image texture information. Furthermore, depth frames can embody depth information corresponding to a video frame. As such, in a further aspect, MVC can include encoding depth frames (e.g., depth video coding). Depth information, generally, can be employed in mapping video frame information for virtual view images to provide a sensation of depth to a rendered image, e.g., three-dimensional (3D) video, freeview content, etc. Whereas video coding for video frames for traditional single-viewpoint video can be considered relatively mature, the discussion presented herein is generally directed to encoding of depth frames. Of note, the terms depth frame, depth video, depth GOP, depth image, or other similar terms, can be employed interchangeably herein, unless otherwise specifically disclosed.

The use of EVSD for MVC coding of depth frames, e.g., multiview depth video coding (MDVC), can facilitate compression of depth information. Where depth information is compressed, transmission of such compressed depth information can require less bandwidth than less compressed or non-compressed depth information. Lower bandwidth requirements are generally desirable. Furthermore, compression of depth frames can facilitate compression of depth information at particular quality levels. In an aspect, EVSD based rate-distortion optimization can be employed for mode selection, motion estimation, disparity estimation and/or reference frame selection of a video codec. In another aspect, EVSD based bit allocation for a macroblock of a depth frame can be employed. As such, view synthesis distortion can be reduced (e.g., minimized) at a given depth bit rate.

Accordingly, the present disclosure can provide depth video coding using EVSD to improve coding efficiency and/or to achieve higher compression efficiency. Experimental results of compression employing EVSD for depth video coding can achieve notable bit rate savings for both high and low bit rates coding. For example, an average Bjontegaard Delta Peak Signal-to-Noise Ratio (BDPSNR) of 1.11 decibel (dB) for different rendering precision setting in terms of depth rate for intra depth coding can be achieved. In another example, an average BDPSNR of 2.36 dB for different rendering precision settings in terms of rendering quality for intra depth coding can be achieved. In yet another example, an average BDPSNR gain of 3.50 dB for inter depth frame coding and intra depth frame coding can be achieved. Furthermore, virtual view image quality can be generally improved where video quality is a higher priority than reduction in bandwidth. The disclosed subject matter can be applied to both INTRA-type frames and/or INTER-type frames. Furthermore, the disclosed subject matter can be applied to mono-view depth video coding. As such, the present disclosure applied to a depth video encoder and/or a depth video decoder can improve coding efficiency and can be adopted in 3D video applications, such as 3D television, free viewpoint television (FTV), etc.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter can be practiced without these specific details. In other instances, well-known structures and devices are illustrated in block diagram form in order to facilitate describing the various embodiments of the subject disclosure.

Turning to the figures, FIG. 1 illustrates a system 100 that can facilitate depth video coding using endurable view synthesis distortion (EVSD) in accordance with an aspect of the subject matter disclosed herein. System 100 can include an encoder component 102 and a distortion estimator component 104. In one example, the system 100 can be implemented as a depth video encoder. The encoder component 102 can receive an input stream 106. For example, the input stream 106 can be implemented as a multiview input stream. The input stream 106 can include depth data (e.g., depth video data, depth data sequence, etc.). Additionally, the input stream 106 can include other video data (e.g., multiview color data). The input stream 106 can include a plurality of contemporaneous disparate views of a scene facilitating a determination of depth information for an object of the scene.

The system 100 can be implemented in a three-dimensional video (3DV) system. For example, the system 100 can be implemented to generate depth video for virtual view image generation. The system 100 can facilitate depth video coding to exploit depth redundancies (e.g., endurable view synthesis distortion) and/or to improve view synthesis image quality at a given depth bit rate.

In one example, the distortion estimator component 104 can be implemented as an EVSD estimator. The distortion estimator component 104 can receive one or more input parameters 108. The one or more input parameters 108 can be associated with at least one image capturing device (e.g., at least one camera) and/or view synthesis information. The one or more input parameters 108 can include, but are not limited to, a focal length value, a baseline value, a rendering position value, a view synthesis precision value, depth information, depth plane of a three-dimensional video scene, image capturing device settings, etc. In one example, the focal length value can be a focal length value for the at least one image capturing device (e.g., the at least one camera). In another example, the baseline value can be a baseline distance value associated with the at least one image capturing device (e.g., the at least one camera) and a virtual image capturing device (e.g., a virtual camera). In yet another example, the depth information can be associated with the multiview input stream. In one embodiment, the one or more input parameters 108 can be provided to the distortion estimator component 104 via a feedback loop (e.g., as feedback information generated by one or more clients). In another embodiment, the one or more input parameters 108 can be determined based on previously generated information.

The distortion estimator component 104 can generate a distortion value (e.g., DISTORTION VALUE shown in FIG. 1) based on the one or more input parameters 108. For example, the distortion estimator component 104 can generate a distortion value as a function of the focal length value, the baseline value, the rendering precision value and/or the depth information. As such, the distortion estimator component 104 can generate a distortion value based on image capturing device information and/or view synthesis information. Furthermore, the distortion estimator component 104 can generate a distortion value for each depth level (e.g., each quantized depth level). For example, a depth value can be quantized as a plurality of depth levels. As such, the distortion estimator component 104 can generate a first distortion value for a first depth level, a second distortion value for a second depth level, a third distortion value for a third depth level, etc. Accordingly, a plurality of depth levels that correspond to a single disparity value can each include a different distortion value.

In one example, the distortion value can be implemented as a EVSD value. The distortion estimator component 104 can be associated with depth image based rendering (DIBR) to facilitate an EVSD model for depth video coding. In DIBR, virtual view image pixels can be rendered from a neighboring reference image pixel with depth z and image capturing device information (e.g., camera information), which can be represented as $$p_2 = z_1 A_2 R_2 R_1^{-1} A_1^{-1} p_1 - A_2 R_2 R_1^{-1} t_1 + A_2 t_2, \quad (1)$$

where $p_2 = [a,b,c]^T$ indicates corresponding pixels in a rendered image, $p_1 = [x,y,1]^T$ indicates corresponding pixels in a real image, $z_1$ is the depth for $p_1$, $A_1$ is a 3×3 matrix indicating image capturing device (e.g., camera) intrinsic parameters for a virtual image capturing device (e.g., a virtual camera), and $A_2$ is a 3×3 matrix indicating image capturing device (e.g., camera) intrinsic parameters for a real image capturing device (e.g., a real camera). $[R_1,t_1]$ and $[R_2,t_2]$ are the extrinsic parameters for the two image capturing devices (e.g., two cameras), where $R_1$ and $R_2$ are rotation matrices, and $t_1$ and $t_2$ are translation factors. The disparity offset in horizontal and vertical direction ($d_x$, $d_y$) between $p_1$ and $p_2$ can be calculated as $$\begin{cases} d_x = R\left(x - \dfrac{a}{c}\right) \\ d_y = R\left(y - \dfrac{b}{c}\right) \end{cases}, \quad (2)$$

where R( ) indicates a rounding operation. The rounding operation function R( ) depends on the pixel accuracy of the view rendering process, and can be mathematically expressed as $$R(x) = \frac{\lfloor x \cdot 2^m + k_f \rfloor}{2^m}, \quad (3)$$

where "$\lfloor \ \rfloor$" is a floor operation, $k_f$ is a compensation factor, and m is a rendering precision value. For example, the rendering precision value m can be equal to 0 for integer pixel precision, 1 for half pixel precision, and 2 for quarter pixel precision.

In an example where a virtual image capturing device (e.g., a virtual camera) and one or more real image capturing devices (e.g., one or more real cameras) are parallel to each other, calibrated, and include the same intrinsic parameters (e.g., $A_1 = A_2$, $R_1 = R_2$, $t_1 - t_2 = [L,0,0]^T$), a vertical rendering position error $d_y$ will be 0 and a horizontal rendering position error $d_x$ is $$d_x = R\left(\frac{f_x L}{Z}\right), \quad (4)$$

where L is a baseline value and $f_x$ is a focal length value. For example, L can be a baseline distance between the real image capturing device and the virtual image capturing device (e.g., between the real and virtual camera). In one example, $f_x$ can be a horizontal focal length. For a depth map in Moving Picture Experts Group three-dimensional video (MPEG-3DV), a non-linear quantization scheme can be implemented to convert physical depth into n-bit depth value ranges from 0 to $2^n - 1$, where n is bit width representing the depth value. The inverse quantization depth value v equal to depth Z can be expressed as $$Z = Q^{-1}(v) = \frac{1}{\dfrac{v}{2^n}\left(\dfrac{1}{Z_{near}} - \dfrac{1}{Z_{far}}\right) + \dfrac{1}{Z_{far}}}, \quad (5)$$

where $Z_{near}$ is the nearest depth plane of a video scene and $Z_{far}$ is the furthest depth plane of a video scene. Applying Eq.5 into Eq.4, horizontal rendering position error $d_x$ can be expressed as $$d_x = R(Lf_x(C_1 v + C_2)) \quad (6)$$

where $$C_1 = \frac{1}{2^n}\left(\frac{1}{Z_{near}} - \frac{1}{Z_{far}}\right), \quad C_2 = \frac{1}{Z_{far}}.$$

In a 3DV system, depth video can be encoded and transmitted to one or more clients for virtual view rendering. However, depth distortion can be introduced as a result of depth coding quantization. In one example, depth distortion $\Delta v$ can be introduced to the depth value v, and distorted depth value $\Delta v + v$ can be used in the pixel rendering. As such, the disparity difference (e.g., when compared with view rendering that includes original depth v) can be calculated as $$\Delta d_x = g(v, \Delta v) = R(Lf_x(C_1 v + C_2)) - R(Lf_x(C_1(v + \Delta v) + C_2)). \quad (7)$$

Figure 5:
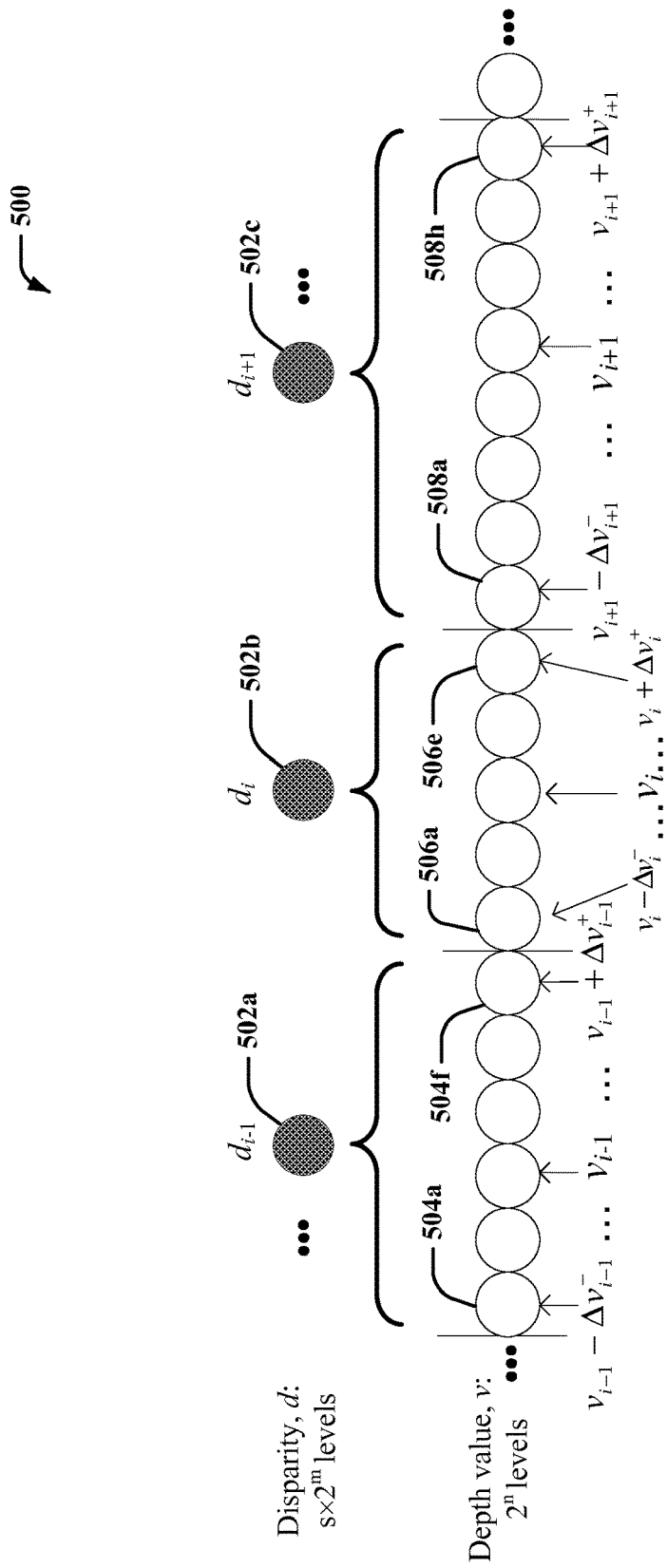
FIG. 5 illustrates mapping of depth value to disparity in accordance with an aspect of the disclosed subject matter.

Due to the rounding process R( ), $\Delta d_x$ may not change while $\Delta v$ changes. As such, the rounding process R( ) can be a many-to-one relation. Let s be the dynamic disparity levels (number of levels from maximum to minimum disparity) between a rendered image and a reference image. Therefore, the number of disparity levels in a given pixel accuracy is $s \times 2^m$ and the number of the depth levels (e.g., the number of levels of v) is $2^n$. As such, a multiple mapping coefficient $c_{MM}$ can be defined as $$c_{MM} = \frac{2^n}{s \times 2^m}, \quad (8)$$

where $c_{MM}$ indicates the number of depth distortions $\Delta v$ that correspond to a single disparity difference $\Delta d_x$. According to an example 3DV implementation for 3D video, n is equal to 8 and the number of disparity levels is less than 30 (e.g., less than 10). As such, when implementing a half pixel rendering process (e.g., m=1), $c_{MM}$ can vary from 4 to 10. Therefore, 4 to 10 different depth distortions $\Delta v$ can be mapped to one disparity $\Delta d_x$. Therefore, as shown in FIG. 5, instead of one single $v_i$, multiple points $v_i+\Delta v \in [v_i-\Delta v_i^-, v_i+\Delta v_i^+]$ can be mapped to the same disparity $d_i$.

Accordingly, if original depth $v_i$ and distorted depth value $v_i+\Delta v$ are within the range $[v_i-\Delta v_i^-, v_i+\Delta v_i^+]$, e.g., $\Delta v \in [\Delta v_i^-, \Delta v_i^+]$, the disparity difference $\Delta d_x$ in Eq.7 will equal to zero (e.g., rendering position error is not present). Furthermore, the distorted depth $\Delta v$ can result in a non-zero disparity difference $\Delta d_x$. A distortion range $\Delta v \in [\Delta v - \Delta_i^-, \Delta v + \Delta v_i^+]$ can provide an equal value for disparity difference $\Delta d_x$ and depth distortion $\Delta v$. Given a depth value $v_i$, the range $\Delta v_i^-$ and $\Delta v_i^+$ can be calculated by the inverse function of g( ) while $\Delta d_x$ equals to half of the $$\frac{1}{2^m}$$

precision (e.g., $$-\frac{1}{2} \cdot \frac{1}{2^m} \text{ and } \frac{1}{2} \cdot \frac{1}{2^m}\Big),$$

which is represented as $$\begin{cases} \Delta v_i^- = \lfloor -g^{-1}(\Delta d_x)|_{\Delta d_x=-1/2^{m+1}, v_i} - \varepsilon \rfloor \\ \Delta v_i^+ = \lfloor -g^{-1}(\Delta d_x)|_{\Delta d_x=-1/2^{m+1}, v_i} + \varepsilon \rfloor \end{cases} \quad (9)$$

where $\varepsilon$ is a positive constant approximately equal to zero. Thus, the interval $R_v=\Delta v_i^-+\Delta v_i^++1$ can be calculated by Eq.10 when $\Delta d_x$ approaches $\frac{1}{2^m}$, $$R_V = g^{-1}\left(\frac{1}{2^m}\right) = \left\lfloor \frac{1}{2^m L f_x C_1} + \zeta \right\rfloor, \quad (10)$$

where $\zeta$ is the rounding error for the rounding process R( ). As such, the distortion value $R_V$ can be different for different depth v. As seen in Eq.10, the distortion value $R_V$ is image capturing device parameter dependent (e.g., camera parameter dependent). Furthermore, the distortion value $R_V$ decreases as the view synthesis precision m, focal length $f_x$ and/or camera baseline L increase. As such, the distortion value $R_V$ can be generated based on the one or more input parameters 108 (e.g., image capturing device information and/or view synthesis information). In one example, the distortion value $R_V$ can be implemented to identify depth redundancies.

The encoder component 102 can be communicatively coupled to the distortion estimator component 104. As such, the encoder component 102 can receive the distortion value generated by the distortion estimator component 104. The encoder component 102 can encode the input stream 106 into an encoded output stream 110 based at least in part on the distortion value. In one example, the encoder component 102 can allocate bits for a macroblock (e.g., a macroblock of a depth frame included in the input stream 106) based on the distortion value. For example, the encoder component 102 can determine number of bits allocated to a macroblock based on the distortion value. In another example, the encoder component 102 can implement rate-distortion optimization (RDO) for mode decision, motion estimation, disparity estimation and/or reference frame selection during depth video coding based on the distortion value. In one example, the encoded output stream 110 can be encoded without residual values representing a difference between a predicted frame and an original frame.

The encoder component 102 can encode depth frames that correlate to video frames. The encoder component 102 can employ one or more compression and/or decompression techniques for coding the input stream 106. The encoder component 102 can include an encoder, decoder, or codec. In an embodiment, the encoder component 102 can include a moving picture experts group (MPEG) codec. As such, an MPEG codec can be both an encoder and a decoder. A codec can provide mechanisms for compression of the input stream 106, such that the encoded output stream 110 can have a lower bandwidth than the input stream 106 for carrying a facsimile of the original content at a particular level of quality. In one embodiment, the encoder component 102 can include an H.264/advanced video coding (AVC) codec. In another embodiment, the encoder component 102 can include a high efficiency video coding (HEVC) codec. Of note, often the term codec can often be used interchangeably with the terms encoder or decoder in that a codec may include both an encoder and decoder, however, as used herein, the term codec can mean an encoder, a decoder, or both an encoder and decoder.

In one example, the encoder component 102 can be implemented as a decoder component (e.g., a codec component). For example, the encoder component 102 (e.g., decoder component) can receive an encoded input stream and/or a distortion value generated by the distortion estimator component 104. As such, the encoder component 102 (e.g., the decoder component) can decode the encoded input stream into a decoded output stream based on the distortion value.

Figure 2:
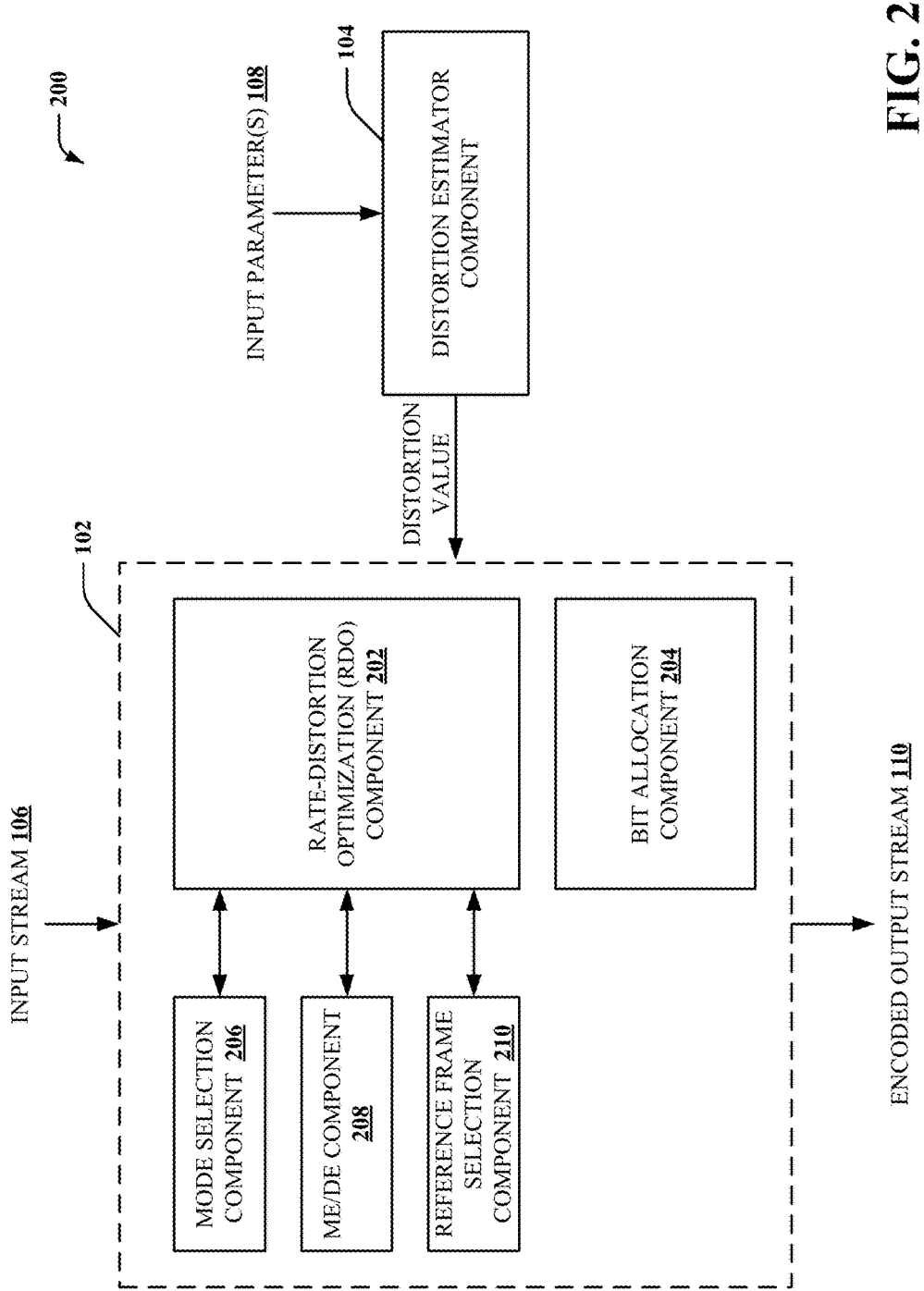
FIG. 2 is a diagram of a system that can facilitate rate-distortion optimization (RDO) and/or bit allocation based on a distortion value in accordance with an aspect of the subject matter disclosed herein.

FIG. 2 depicts an exemplary system 200 that can facilitate MVC based on a distortion value in accordance with an aspect of the disclosed subject matter disclosed herein. System 200 can include the encoder component 102 and the distortion estimator component 104. The encoder component 102 can include a RDO component 202 and a bit allocation component 204. The RDO component 202 can be associated with and/or in communication with a mode selection component 206, a motion estimation/disparity estimation (ME/DE) component 208 and/or a reference frame selection component 210. In one example, the mode selection component 206, the ME/DE component 208 and/or the reference frame selection component 210 can be implemented separate from the RDO component 202. In another example, the mode selection component 206, the ME/DE component 208 and/or the reference frame selection component 210 can be implemented within the RDO component 202.

The RDO component 202 can implement one or more rate-distortion optimization algorithms for mode decision, motion estimation, disparity estimation and/or reference frame selection. The RDO component 202 can implement a RDO model. For example, the RDO component 202 can generate one or more estimation cost functions based on the distortion value provided by the distortion estimator component 104 for mode decision, motion estimation, disparity estimation and/or reference frame selection. As such, a rate-distortion model can be generated based on the distortion value generated by the distortion estimator component 104 for mode decision, motion estimation, disparity estimation and/or reference frame selection. Accordingly, mode decision, motion estimation, disparity estimation and/or reference frame selection can be improved. Furthermore, prediction accuracy for depth video coding can be improved.

The RDO component 202 can be implemented to encode and/or decode the input stream 106 based on intra frame coding and/or inter frame coding. In one example, RDO component 202 can process the input stream 106 (e.g., depth video) as a Y component of color. Additionally or alternatively, the RDO component 202 can code the input stream 106 based on a hybrid H.264/AVC based coding standard. As such, a RD model implemented by the RDO component 202 can be represented as $$R(D) = k \ln(\sigma^2/D), \tag{11}$$

where D is output distortion and $\sigma^2$ is an input picture variance. The RDO component 202 can determine the derivative of R(D) with respect to D. Furthermore, the derivative of R(D) with respect to D can be set equal to $-1/\lambda_{MODE}$, yielding $$dR(D)/dD = -1/\lambda. \tag{12}$$

Substituting Eq.11 into Eq.12, the Lagrangian multiplier can be represented as $$\lambda = D/k. \tag{13}$$

Since reconstructed depth video is used to generate a virtual view, the RDO component 202 can implement a RD model based on distortion (e.g., distortion of synthesized virtual view ($D_{VS}$)). As for bit rate, compressed depth video bit rate $R_d$ can be transmitted. As such, $R_d(D_{VS})$ equals to $R_d(D_d)$. Therefore, relationship between depth bit rate $R_d$ and $D_{VS}$ can be formulated as $$R_d(D_{VS}) = R_d(D_d) = k \ln(\sigma_d^2/D_d), \tag{14}$$

where k is a weighted coefficient, $D_d$ is depth distortion (e.g., output distortion) and $\sigma_d^2$ is input picture variance of depth video. Similarly, the RDO component 202 can determine the derivative of $R_d(D_{VS})$ with respect to view synthesis distortion $D_{VS}$. Furthermore, the derivative of $R_d(D_{VS})$ with respect to $D_{VS}$ can be set equal to $-1/\lambda^{VS}$ to calculate the Lagrangian factor ($\lambda^{VS}$) for a view synthesis oriented RD model. Therefore $$\frac{dR(D_{VS})}{dD_{VS}} = \frac{dR(D_d)/dD_d}{dD_{VS}/dD_d} \equiv -\frac{1}{\lambda^{VS}}. \tag{15}$$

Rendering position error $\Delta r_{ij}$ can be formulated as $$\Delta r_{ij} = \frac{1}{R_V} \Delta v_{ij} + \varepsilon_{ij}, \tag{16}$$

where $\varepsilon_{ij}$ is a zero mean uniform distributed rounding error. As indicated by the Law of Large Number (LLN), the average value of all the samples approximates to the expected value when number of samples is large. In one example, distortion can be determined based on mean squared error (MSE). As such, rendering position error $D_r$ can be presented as $$D_r \approx E(\Delta r^2) = \left(\frac{1}{R_V}\right)^2 E(\Delta v^2) + 2\frac{1}{R_V} E(\Delta v \varepsilon) + E(\varepsilon^2). \tag{17}$$

where E( ) is an expectation function. For image coding, the depth difference $\Delta v$ and rounding error $\varepsilon$ can be regarded as independent variables. Therefore, $E(\Delta v\varepsilon) = E(\Delta v)E(\varepsilon)$. The error $\Delta v$ for video coding and rounding error $\varepsilon_{ij}$ can be regarded as zero mean distributed. Thus, $E(\Delta v \varepsilon) = 0$ since $E(\Delta v) = 0$, $E(\varepsilon) = 0$. Therefore, Eq.17 can be expressed as $$D_r = \frac{1}{R_V^2} D_d + E(\varepsilon^2), \tag{18}$$

where $D_d$ and $D_r$ are measured with MSE, $E(\varepsilon^2)$ is independent to $D_d$ and the derivative $$\frac{\partial E(\varepsilon^2)}{\partial D_d} = 0.$$

Figure 6:
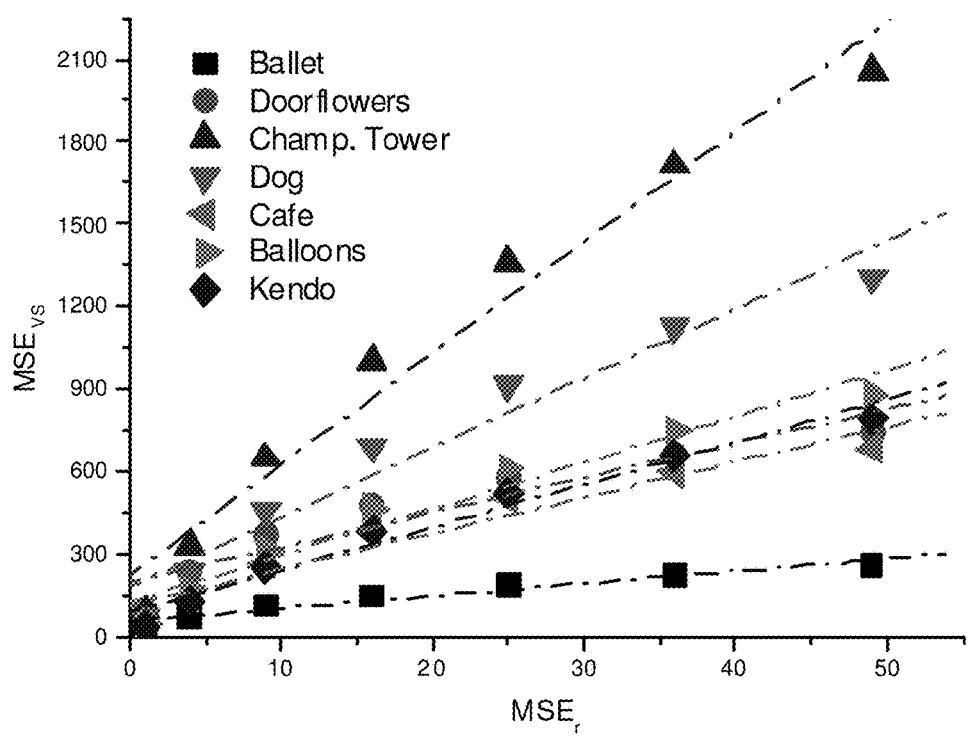
FIG. 6 illustrates a statistical view synthesis distortion/rendering position error relationship measured in terms of mean squared error (MSE) in accordance with an aspect of the disclosed subject matter.
Figure 7:
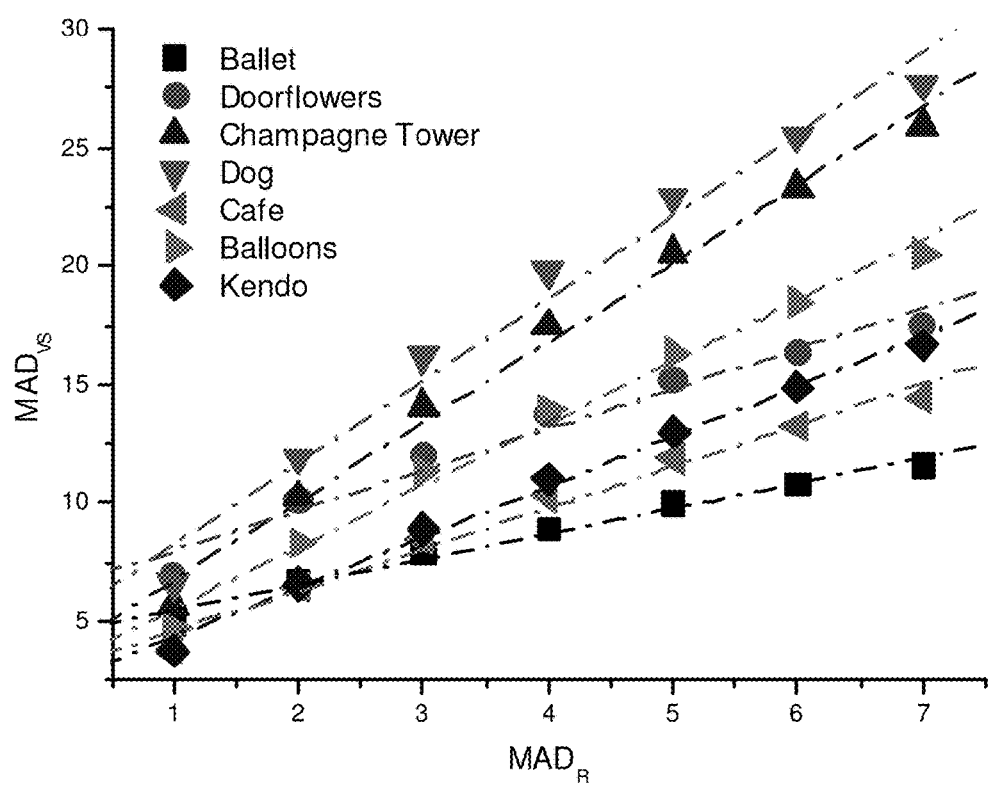
FIG. 7 illustrates a statistical view synthesis distortion/rendering position error relationship measured in terms of mean absolute difference (MAD) in accordance with an aspect of the disclosed subject matter.

As shown in FIGS. 6 and 7, a linear relationship exists between $D_{VS}$ and $D_r$ when measured in MSE or mean absolute difference (MAD). Hence, derived from Eq.32 in connection with FIGS. 6 and 7, Eq.15 can be rewritten as $$\frac{-k/D_d}{d(K_1 D_r + K_2)/dD_d} = -\frac{1}{\lambda_{MODE}^{VS}}. \tag{19}$$

where $\lambda_{MODE}^{VS}$ is the Lagrangian multiplier for mode decision, and $K_1$ and $K_2$ are constant coefficients, where $K_1$ is correlated with color texture and generally increases as texture complexity increases. Applying Eq. 18 into Eq. 19, the Lagrangian multiplier for mode decision can be represented as $$\lambda_{MODE}^{VS} = K_1 D_d/(k R_V^2). \tag{20}$$

The RDO component 202 and/or the mode selection component 206 can be implemented to determine a mode for depth coding based at least in part on the distortion value. For example, the RDO component 202 and/or the mode selection component 206 can be implemented to select, for example, an intra-prediction mode, an inter-prediction mode, a directional mode, a luminance mode and/or a chrominance mode for depth coding based at least in part on the distortion value. When depth video is coded by, for example, a H.264/AVC based video codec (e.g., when the encoder 102 implements a H.264/AVC based video codec), the D in Eq.13 equals to $D_d$. Then, applying Eq.13 to Eq.20, the Lagrangian multiplier for mode decision can be represented as $$\lambda_{MODE}^{VS} = K_1 \lambda_{MODE}/R_V^2. \tag{21}$$

Depth video is implemented for virtual view image synthesis. As such, depth video is not directly viewed by a user (e.g., depth video is not viewed on a display). Hence, in the depth video coding, it is desirable to minimize the distortion of the synthesized virtual image at a given bit rate. Therefore, an EVSD based Lagrangian cost function for mode decision can be represented as $$\min J_{MODE}^{VS}, \text{where } J_{MODE}^{VS}(m_M) = SSD_{VS}(m_M) + \lambda_{MODE}^{VS} R_d(m_M) = K_1 SSD_r(m_M) + (K_1 \lambda_{MODE}/R_V^2) R_d(m_M) + K_2. \tag{22}$$

where $m_M$ indicates variable block-size mode, $K_1$ and $K_2$ are constants, $R_d(m_M)$ indicates bits of encoding mode $m_M$ and residual. Therefore, the EVSD based Lagrangian cost function for mode decision in Eq. 22 can be rewritten as $$\min J_{MODE}{}^{VS}, \text{where } J_{MODE}{}^{VS}(m_M) = R_v{}^2 SSD_r(m_M) + \lambda_{MODE} R_d(m_M). \quad (23)$$

As such, the EVSD based mode decision (e.g., in association with the mode selection component 206) can be implemented for encoding depth video based on $R_V{}^2 D_r$ ($m_M$) where $R_v$ is obtained from one or more image capturing device parameters (e.g., one or more camera parameters), one or more baseline values, etc. Furthermore, a distortion metric can be implemented without coefficient $K_1$ and coefficient $K_2$ (e.g., a distortion metric can be implemented without a color effect associated with view synthesis).

The RDO component 202 and/or the ME/DE component 208 can be implemented to facilitate motion estimation (ME) and/or disparity estimation (DE) based on the distortion value. For example, the RDO component 202 and/or the ME/DE component 208 can be implemented to determine a motion vector for depth coding based at least in part on the distortion value. A first order distortion metric, such as, but not limited to, MAD or sum of absolute difference (SAD) can be employed for a ME process and/or a DE process (e.g., instead of a second order distortion metric, such as, but not limited to sum of squared differences (SSD) or MSE). As such, the motion estimation process and/or the disparity estimation process can be simplified. Therefore, a RD model for motion estimation and/or disparity estimation can be generated similar to the EVSD based mode selection. The RDO component 202 and/or the reference frame selection component 210 can be implemented to determine a reference frame for depth coding based at least in part on the distortion value.

Absolute rendering position error $|\Delta r_{ij}|$ can be represented as $$|\Delta r_{ij}| = \frac{1}{R_V}|\Delta v_{ij}| + \zeta_{ij}, \quad (24)$$

where $\zeta_{ij}$ is the rounding error with $R_V/2$ mean uniform distribution. Similarly, when distortion is measured in terms of MAD, the $D_r$ can be presented as the expectation of $|\Delta r_{ij}|$, which is $$D_r \approx E(|\Delta r|) = \frac{1}{R_V} E(|\Delta v|) + E(\zeta), \quad (25)$$

where $$E(\zeta) = \frac{R_V}{2}$$

is a constant that is independent to the distortion $D_d$, $E(|\Delta v|)$ is a MAD of a distorted depth image, e.g., $D_d$. Applying Eq. 25 to Eq. 15 yields $$-\frac{kR_V}{K_1 D_d} = -\frac{1}{\lambda_{MOTION}^{VS}}. \quad (26)$$

Applying Eq. 13 to Eq. 26 as $D_d = D$, a Lagrangian multiplier for ME/DE can be represented as $$\lambda_{MOTION}{}^{VS} = K_1 \lambda_{MOTION}/R_V. \quad (27)$$

As such, a new Lagrangian cost function for ME, DE and/or reference frame selection can be represented as $$J_{MOTION}{}^{VS} = SAD_{VS} + \lambda_{MOTION}{}^{VS} R_d = K_1 SAD_r + (K_1 \lambda_{MOTION}/R_V) R_d + K_2, \quad (28)$$

where $R_d$ can indicate the number of bits for encoding reference frame indices, the number of motiondisparity vectors for a depth image, etc. Therefore, the EVSD based Lagrangian cost function for ME, DE and/or reference frame selection can be rewritten as $$\min J_{MOTION}{}^{VS}, \text{where } J_{MOTION}{}^{VS} = R_V SAD_r + \lambda_{MOTION} R_d. \quad (29)$$

As such, the EVSD based ME, DE and/or reference frame selection decision (e.g., in association with the ME/DE component 208 and/or the reference frame selection component 210) can be implemented for encoding depth video based on $R_V SAD_r$.

The bit allocation component 204 can implement one or more bit allocation algorithms to minimize depth redundancies and/or reduce depth bit rate while maintaining view synthesis image quality. For example, the bit allocation component 204 can implement bit allocation for a macroblock of a depth frame (e.g., a depth frame included in the input stream 106) based at least in part on the distortion value generated by the distortion estimator component 104. In one example, a coding quantization parameter for a current macroblock can be associated with the distortion value and/or a current residual value. As such, a coding quantization parameter can be determined based at least in part on the distortion value.

Figure 3:
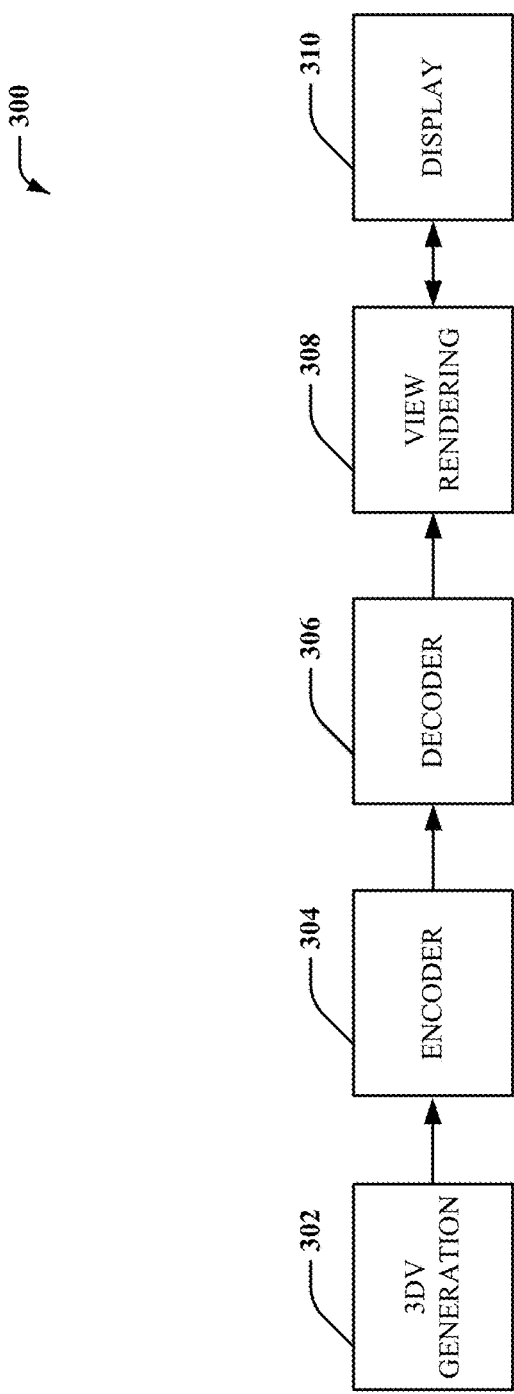
FIG. 3 is a diagram of an exemplary three-dimensional video (3DV) system in accordance with an aspect of the disclosed subject matter.

FIG. 3 depicts an exemplary system 300 that can facilitate MVC in accordance with an aspect of the disclosed subject matter disclosed herein. In one example, system 300 can be implemented as a 3DV system. System 300 can include a 3DV generation component 302, an encoder 304, a decoder 306, a view rendering component 308 and a display 310. In one example, the 3DV generation component 302 and/or the encoder 304 can be implemented on one or more servers. Furthermore, the decoder 306, the view rendering component 308 and/or the display 310 can be implemented on one or more clients.

The system 300 can implement multiview color video and/or corresponding depth video to represent a 3D world scene. Depth video is generally used for virtual view image generation instead of being watched directly by a viewer. Multiview color video and/or depth video can be captured by the 3DV generation component 302. In one example, the 3DV generation component 302 can generate depth video using one or more stereo matching algorithms.

The encoder 304 can encode the multiview color video and/or the depth video. For example, the encoder 304 can implement the system 100 or the system 200. Furthermore, the encoder 304 can transmit the encoded multiview color video and/or the encoded depth video to the decoder 306. The encoder 304 can transmit the encoded multiview color video and/or the encoded depth video to the decoder 306 via one or more channels and/or a storage device.

The view rendering component 308 can generate virtual view color video based on the decoded (e.g., reconstructed) multiview color video and/or the decoded (e.g., reconstructed) depth video. For example, the view rendering component 308 can employ one or more view generation algorithms to generate the virtual view color video. Furthermore, the view rendering component 308 can transmit the reconstructed sparse multiview color and/or the rendered virtual view video to the display 310.

Figure 4:
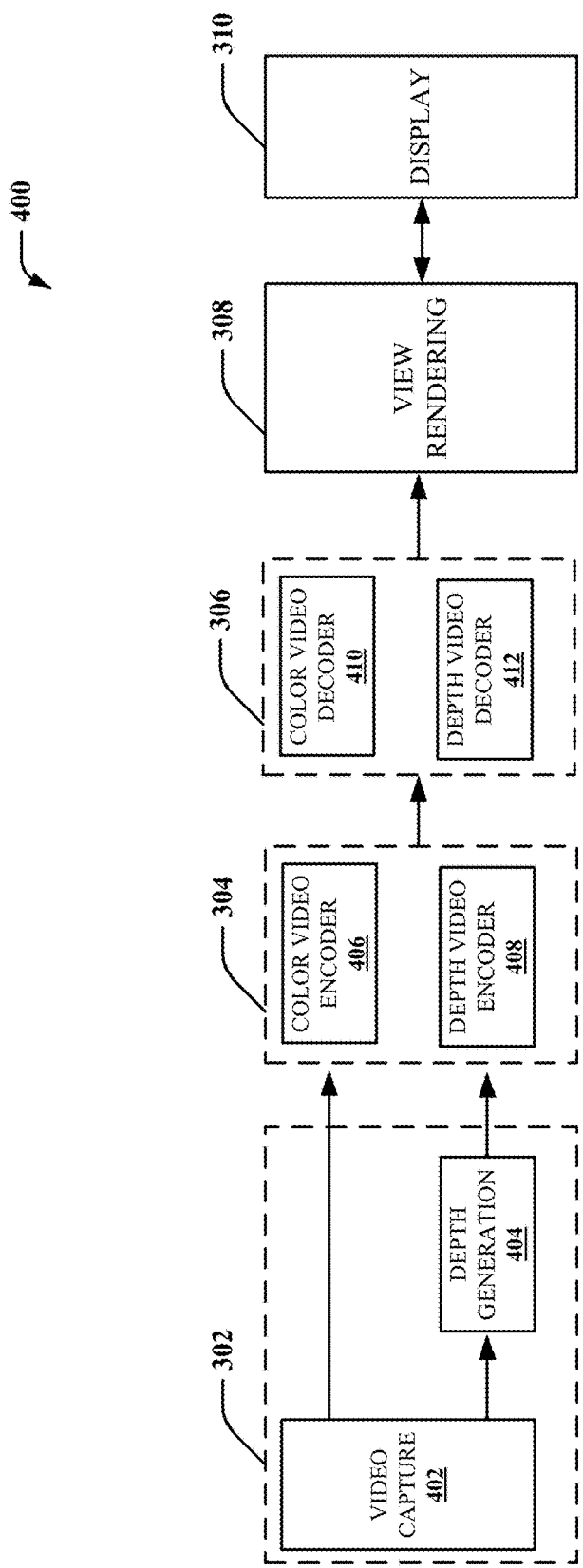
FIG. 4 is a diagram of another exemplary 3DV system in accordance with an aspect of the disclosed subject matter.

FIG. 4 depicts an exemplary system 400 that can facilitate MVC using a depth video encoder and/or a depth video decoder in accordance with an aspect of the disclosed subject matter disclosed herein. In one example, system 400 can be implemented as a 3DV system. System 400 can include the 3DV generation component 302, the encoder 304, the decoder 306, the view rendering component 308 and the display 310. The 3DV generation component 302 can include a video capture component 402 and a depth generation component 404. The encoder 304 can include a color video encoder 406 and a depth video encoder 408 (e.g., the system 100 or the system 200). The decoder 306 can include a color video decoder 410 and a depth video decoder 412 (e.g., the system 100 or the system 200).

The system 400 can implement multiview color video and corresponding depth video to represent a 3D world scene. Multiview color video and/or depth video can be captured by the video capture component 402. For example, video capture component 40 can capture the multiview color video and/or depth video via one or more image capturing devices (e.g., one or more cameras). In one example, the depth generation component 404 can generate depth video using one or more stereo matching algorithms.

The color video encoder 406 can encode the multiview color video. The depth video encoder 408 can encode the depth video. Furthermore, the color video encoder 406 can transmit the encoded multiview color video to the color video decoder 410. Additionally, the depth video encoder 408 can transmit the encoded depth video to the depth video decoder 412.

The view rendering component 308 can generate virtual view color video based on the decoded (e.g., reconstructed) multiview color video and/or the decoded (e.g., reconstructed) depth video. For example, the view rendering component 308 can employ one or more view generation algorithms to generate the virtual view color video. Furthermore, the view rendering component 308 can transmit the reconstructed sparse multiview color and/or the rendered virtual view video to the display 310.

FIG. 5 illustrates a diagram 500 for mapping of depth value to disparity in accordance with an aspect of the disclosed subject matter. Diagram 500 includes a disparity level 502a, a disparity level 502b and a disparity level 502c. However, it is to be appreciated that a different number of disparity levels can be implemented. Diagram 500 also includes depth values (e.g., quantized depth levels) 504a-f, depth values (e.g., quantized depth levels) 506a-e and depth values (e.g., quantized depth levels) 508a-h. The depth values 504a-f (e.g., six depth values) are mapped to disparity level 502a, the depth values 506a-e (e.g., five depth values) are mapped to disparity level 502b and depth values 508a-h (e.g., eight depth values) are mapped to disparity level 502c. However, it is to be appreciated that a different number of depth values can be mapped to each disparity level. As such, a plurality of depth values (e.g., depth levels) can be mapped to a single disparity level (e.g., a single disparity value).

As shown in FIG. 5, depth value to the disparity levels can be a many to one mapping process. For example, a plurality of depth levels can be associated with a particular disparity level. Therefore, instead of one single $v_i$, multiple points $v_i + \Delta v \in [v_i - \Delta v_i^-, v_i + \Delta v_i^+]$ are mapped to the same disparity $d_i$. Each depth value (e.g., depth level) can include (e.g., can be associated with) a distortion value $R_v$. For example, the depth value 504a can include a first distortion value, depth value 504b can include a second distortion value, depth value 504c can include a third distortion value, etc. In one example, depth value to disparity level mapping is a many to one mapping process when the distortion value $R_v$ is larger than 1. As such, depth value to disparity level mapping can be a function of the distortion value $R_v$ (e.g., image capturing device information and/or view synthesis information).

FIGS. 6 and 7 include plots 600 and 700 that illustrate a statistical view synthesis distortion/rendering position error relationship in accordance with an aspect of the disclosed subject matter. Plot 600 illustrates statistical view synthesis distortion/rendering position error relationship measured in terms of MSE in accordance with an aspect of the disclosed subject matter. Plot 700 illustrates a statistical view synthesis distortion/rendering position error relationship measured in terms of MAD in accordance with an aspect of the disclosed subject matter.

For depth video coding, depth distortion ($D_d$) can lead to rendering position error ($D_r$) in view synthesis. Furthermore, rendering position error ($D_r$) can lead to view synthesis distortion ($D_{VS}$). Therefore, to analyze a $D_{VS}$–$D_d$ relation and the EVSD, analysis can be divided into a first step $D_{VS}$–$D_r$ and a second step $D_r$–$D_d$.

When depth maps are uncompressed, the virtual view image $I_{Dorg}{}^V$ is projected from the pixels of reference image $I_T$ with offset $m_{ij}$, e.g., $I_{Dorg}{}^V = I_T(m_{ij})$. However, when depth maps are compressed, the virtual view image $I_{D,rec}{}^V$ is also projected from $I_T$ but with different offset $m_{ij} + \Delta r_{ij}$, where $\Delta r_{ij}$ is rendering position offset at position (i,j) caused by depth distortion, e.g., $I_{Drec}{}^V = I_T(m_{ij} + \Delta r_{ij})$. Consequently, the synthesized virtual view image distortion caused by depth coding can be calculated as $$D_{VS} = I_{Dorg}{}^V - I_{Drec}{}^V = I_T(m_{ij}) - I_T(m_{ij} + \Delta r_{ij}). \quad (30)$$

Therefore, the synthesized image distortion caused by depth distortion is approximated as the difference among neighboring pixels in the color image $I_T$. Therefore, an average VSD value $D_{VS}$ is $$D_{VS} = \frac{1}{MN} \sum_{x,y} |I_T(i,j) - I_T(i + \Delta r_{ij}^x, j + \Delta r_{ij}^y)|^\beta, \quad (31)$$

where $\beta$ is 1 for MAD and 2 for MSE, $\Delta r_{ij}^x$ is a horizontal rendering position error at position (i,j), $\Delta r_{ij}^y$ is vertical rendering position error at position (i,j), M is width of an image, and N is height of an image. To analyze the $D_{VS}$–$D_r$ relation, average $\Delta r_{ij}^x$ and $\Delta r_{ij}^y$ can be set equal and seven different sequences can be tested (e.g., $\Delta \bar{r}_{ij}^x = \Delta \bar{r}_{ij}^y = \Delta r$, $\Delta r \in \{1, 2, 3, 4, 5, 6, 7\}$).

As such, FIGS. 6 and 7 plot the relationship between $D_{VS}$–$D_r$, where the seven different sequences (e.g., seven groups of data) are collected data (e.g., data associated with an image frame and/or a depth frame) and the corresponding dot lines are a linear fitting of the collected data. For example, the different sequences (e.g., groups of data) shown in FIGS. 6 and 7 include Ballet, Doorflowers, Champ. Tower, Dog, Cafe, Balloons and Kendo. Each sequence (e.g., group of data) can correspond to an image frame and/or a depth frame. As shown in FIGS. 6 and 7, a linear relationship exists between $D_{VS}$ and $D_r$ when measured in MSE or MAD. Therefore, the $D_{VS}$ can be modeled as $$D_{VS} = K_1 D_r + K_2, \quad (32)$$

where $$D_r = \frac{1}{MN} \Sigma\Sigma \Delta r_{ij}^\beta$$

is the MSE or MAD of the rendering offset $\Delta r_{ij}$. $K_1$ and $K_2$ are constant coefficients, where $K_1$ is correlated with color texture and generally increases as texture complexity increases. Derived from Eq. 32, the linear relationship between $D_{VS}$ and $D_r$ is also linear when both $D_{VS}$ and $D_r$ are measured with SAD or SSD.

Figure 8:
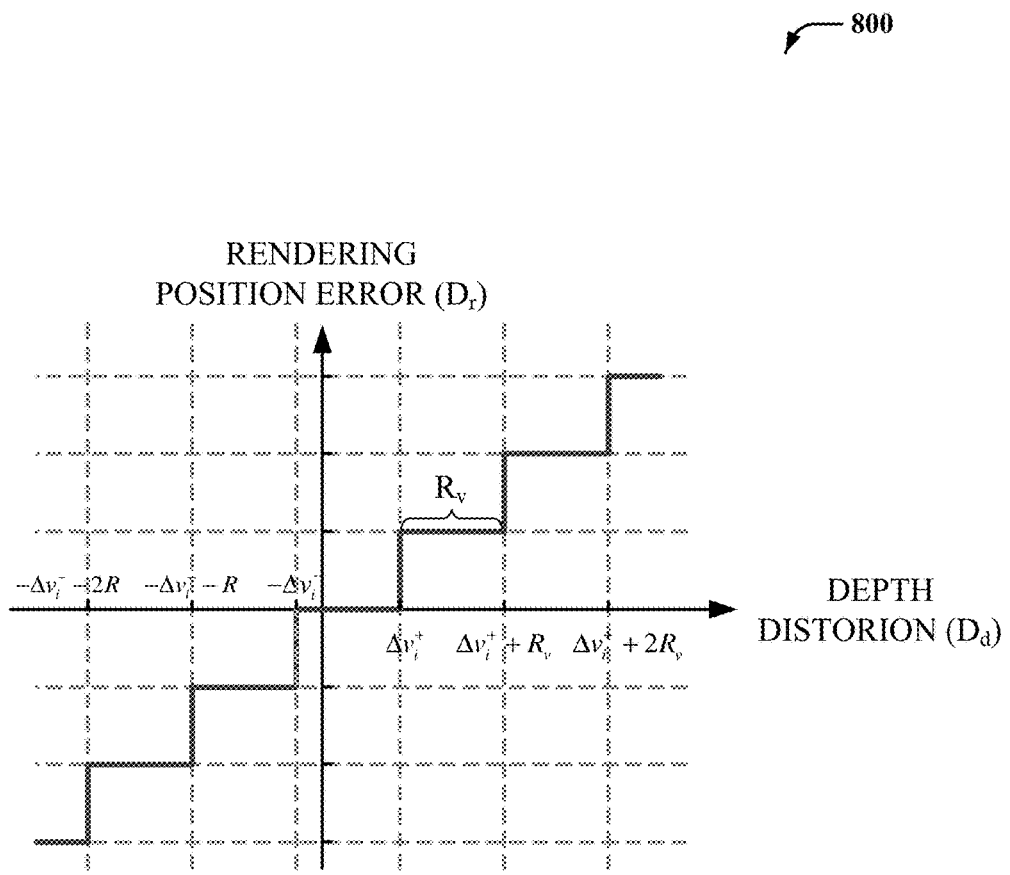
FIG. 8 illustrates a pixel wise relationship between depth distortion and rendering position error in accordance with an aspect of the disclosed subject matter.

FIG. 8 depicts a graph 800 that illustrates a pixel wise relationship between depth distortion (e.g., depth error) $D_d$ and rending position error $D_r$ in accordance with an aspect of the disclosed subject matter disclosed herein. A quantization process can be implemented to map $D_d$ to $D_r$, where the quantization interval is $R_V$. In one example, the $D_r$–$D_d$ relation map can be asymmetric with the origin of the coordinate. The rendering position error for each pixel at position (i,j) ($\Delta r_{ij}$) can be represented as $$\Delta r_{ij} = \begin{cases} \left\lceil \frac{\Delta v_{ij} - \Delta v_{ij}^+}{R_V} \right\rceil + 1 & \Delta v_{ij} > \Delta v_{ij}^+ \\ 0 & -\Delta v_{ij}^- \leq \Delta v_{ij} \leq v_{ij}^+ \\ \left\lceil \frac{\Delta v_{ij} - \Delta v_{ij}^-}{R_V} \right\rceil - 1 & \Delta v_{ij} < -\Delta v_{ij}^+ \end{cases} \quad (33)$$

where "$\lceil \ \rceil$" is a ceiling operation, $\Delta v_{ij}$ is the depth value difference between the original depth value $v_{ij}$ and the reconstructed depth value $\tilde{v}_{ij}$ position (i,j). If $\Delta v_{ij}^+$ and $\Delta_{ij}^-$; are zero, $R_v$ equals to 1, and EVSD based distortion can be equal to a distortion value generated without the one or more input parameters 108 (e.g., without image capturing device information and/or view synthesis information). Therefore, the relation between $D_{VS}$ and $D_d$ shown in FIG. 8 can be derived by combining Eq.32 and Eq.33.

FIGS. 9-12 illustrate methods and/or flow diagrams in accordance with the disclosed subject matter. For simplicity of explanation, the methods are depicted and described as a series of acts. It is to be understood and appreciated that the various embodiments of the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states by way of state diagram or events. Additionally, it should be further appreciated that the methods disclosed hereinafter and throughout this specification are capable of being stored on an article of manufacture to facilitate transporting and transferring such methods to computers. The term article of manufacture, as used herein, can encompass a computer program accessible from any computer-readable device, carrier, or media.

Figure 9:
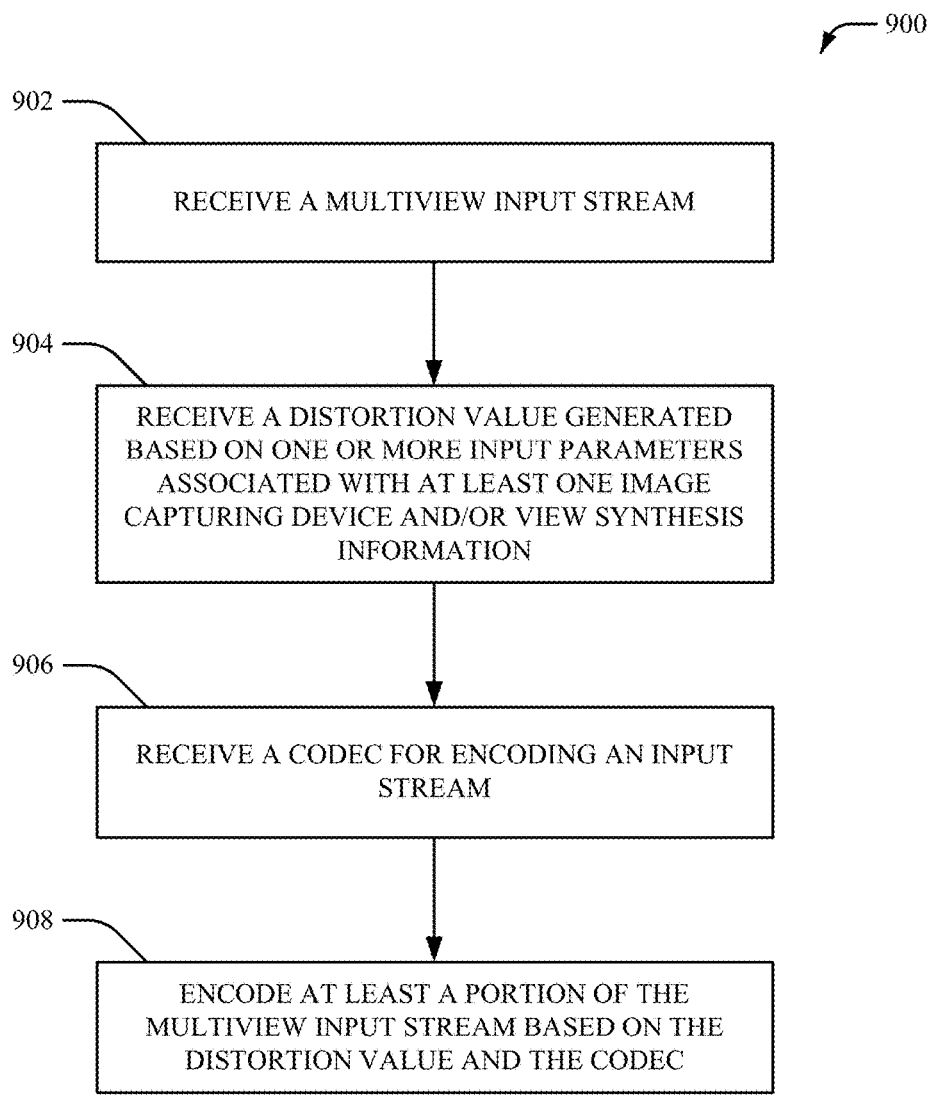
FIG. 9 depicts a method that facilitates depth video coding based on a distortion value in accordance with an aspect of the disclosed subject matter.

FIG. 9 illustrates a method 900 that facilitates depth video coding based on a distortion value in accordance with an aspect of the disclosed subject matter. At 902, method 900 can receive a multiview input stream (e.g., using an encoder component 102). A multiview input stream can include a plurality of view information. A multiview input stream can also include depth information correlated to video information.

At 904, a distortion value generated based on one or more input parameters associated with at least one image capturing device and/or view synthesis information can be received (e.g., by an encoder component 102). For example, one or more input parameters can be associated with at least one image capturing device (e.g., camera) and/or view synthesis information. The one or more input parameters can include, but are not limited to, a focal length value, a baseline value, a rendering precision value and/or depth information.

At 906, a codec for encoding an input stream can be received (e.g., by an encoder component 102). In an aspect, the codec can be a H.264/AVC codec. In another aspect, the codec can be a HEVC codec. The codec can facilitate coding of an input stream into an encoded output stream.

At 908, at least a portion of the multiview input stream can be encoded (e.g., by an encoder component 102) based on the distortion value and the codec. For example, an encoded output stream can be generated based on the distortion value and the codec.

Figure 10:
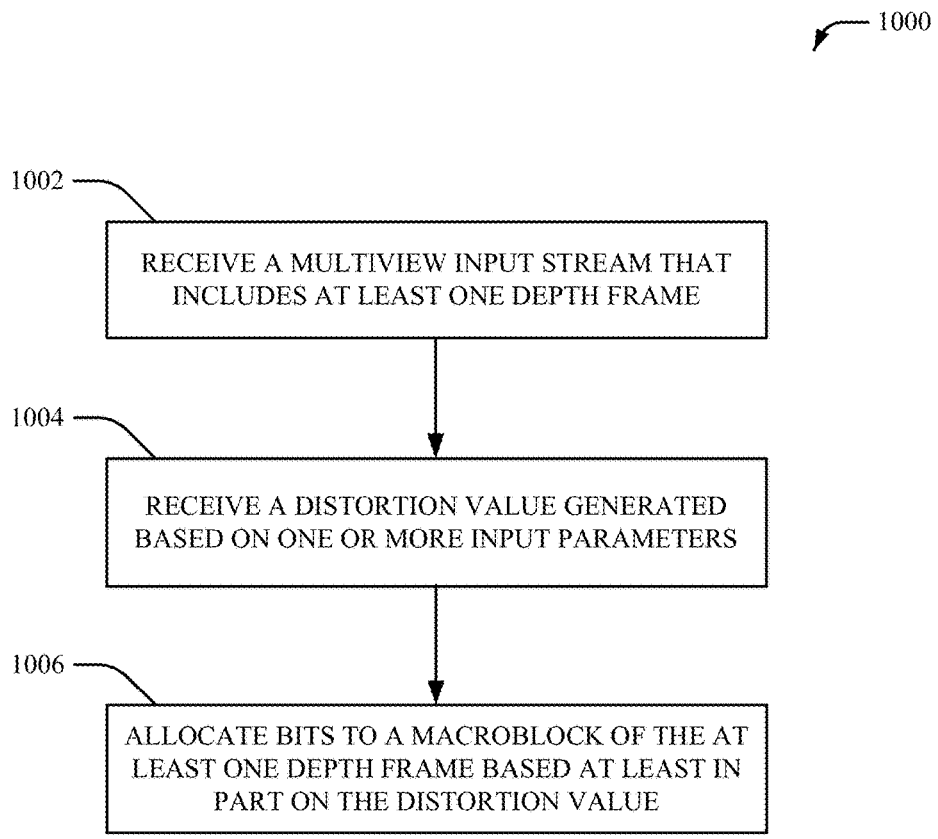
FIG. 10 depicts a method that facilitates bit allocation based on a distortion value in accordance with an aspect of the disclosed subject matter.

FIG. 10 illustrates a method 1000 that facilitates bit allocation based on a distortion value in accordance with an aspect of the disclosed subject matter. At 1002, method 1000 can receive a multiview input stream that includes at least one depth frame (e.g., using an encoder component 102). A multiview input stream can include a plurality of view information. A multiview input stream can also include depth information correlated to video information. The at least one depth frame can be implemented for depth coding.

At 1004, a distortion value generated based on one or more input parameters can be received (e.g., by an encoder component 102). For example, one or more input parameters can be associated with at least one image capturing device (e.g., camera) and/or view synthesis information. The one or more input parameters can include, but are not limited to, a focal length value, a baseline value, a rendering precision value and/or depth information.

At 1006, bits can be allocated (e.g., using a bit allocation component 204) to a macroblock of the at least one depth frame based at least in part on the distortion value. In one example, a coding quantization parameter for a macroblock can be associated with the distortion value.

Figure 11:
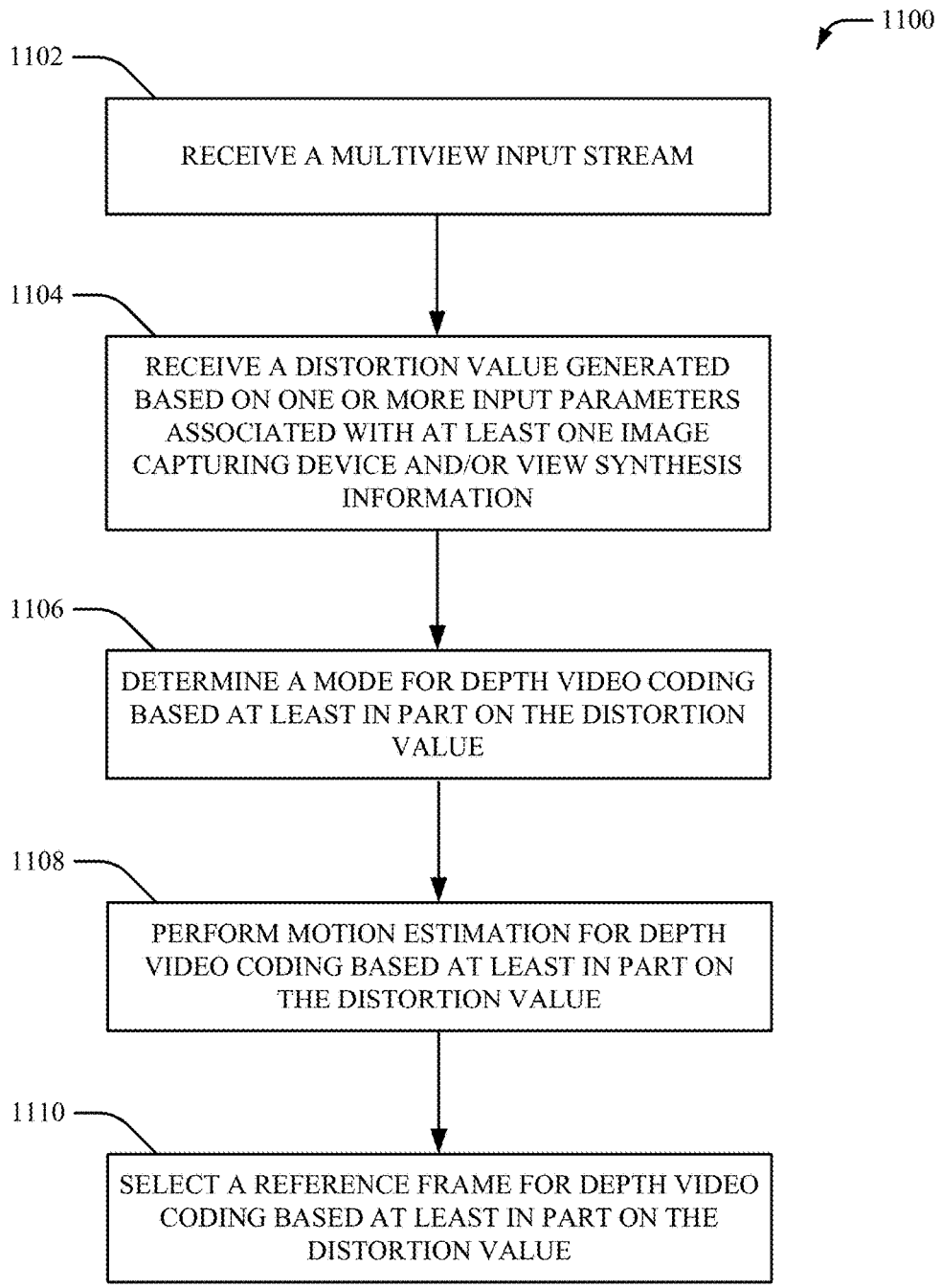
FIG. 11 depicts a method that facilitates RDO optimization based on a distortion value in accordance with an aspect of the disclosed subject matter.

FIG. 11 illustrates a method 1100 that facilitates RDO optimization based on a distortion value in accordance with an aspect of the disclosed subject matter. At 1102, method 1100 can receive a multiview input stream (e.g., using an encoder component 102). A multiview input stream can include a plurality of view information. A multiview input stream can also include depth information correlated to video information.

At 1104, a distortion value generated based on one or more input parameters associated with at least one image capturing device and/or view synthesis information can be received (e.g., by an encoder component 102). For example, one or more input parameters can be associated with at least one image capturing device (e.g., camera) and/or view synthesis information. The one or more input parameters can include, but are not limited to, a focal length value, a baseline value, a rendering precision value and/or depth information.

At 1106, a mode for depth video encoding can be determined (e.g., by a RDO component 202 and/or a mode selection component 206) based at least in part on the distortion value. For example, an intra-prediction mode and/or a inter-prediction mode can be determined based at least in part on the distortion value.

At 1108, motion estimation for depth encoding can be performed (e.g., using a RDO component 202 and/or a ME/DE component 208) based at least in part on the distortion value. In one example, a motion vector for depth coding can be determined based at least in part on the distortion value.

At 1110, a reference frame for depth encoding can be selected (e.g., using a RDO component 202 and/or a reference frame selection component 210) based at least in part on the distortion value. For example, a reference frame for inter-frame depth coding can be selected based at least in part on the distortion value.

Figure 12:
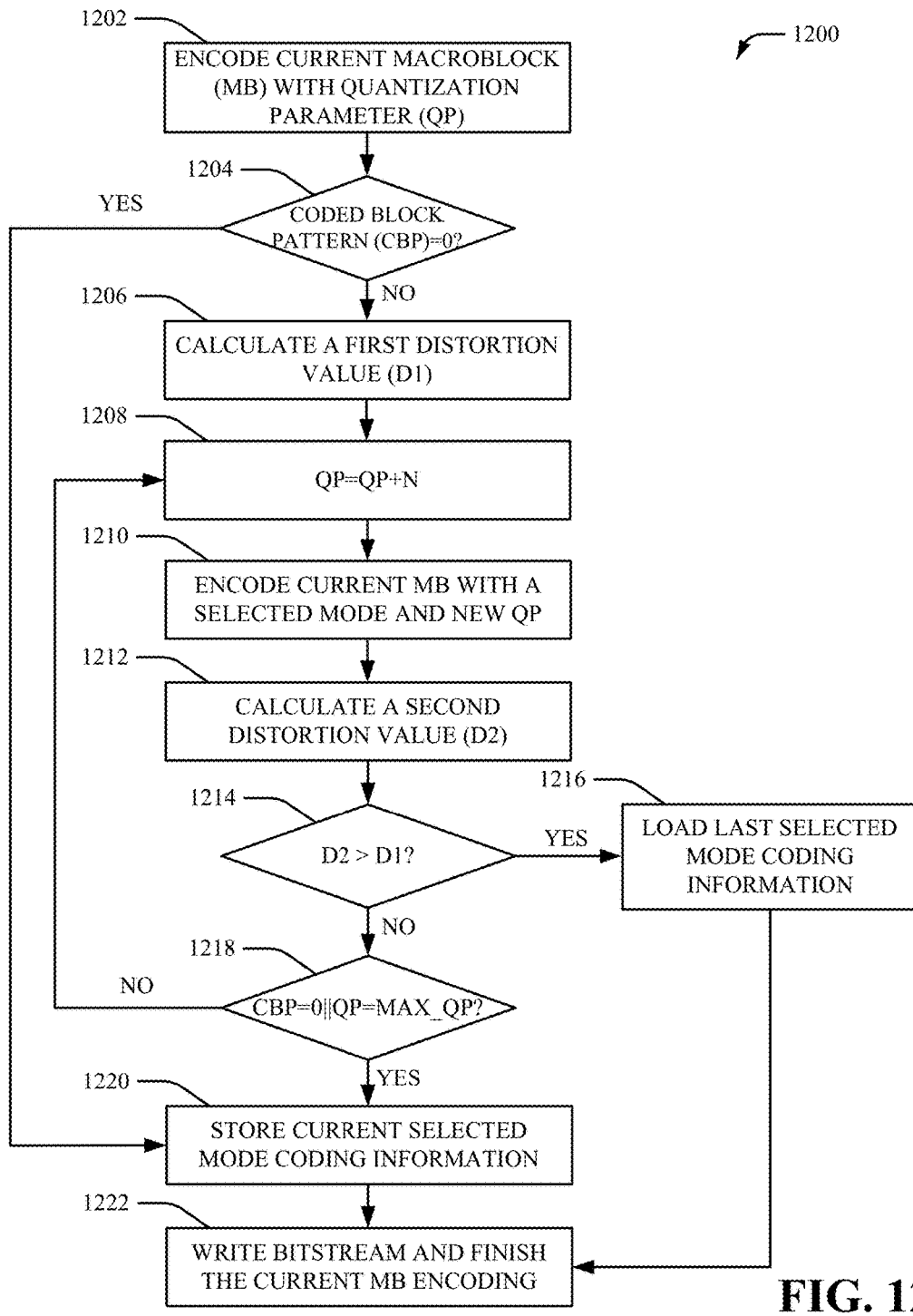
FIG. 12 depicts a method that facilitates endurable view synthesis distortion (EVSD) based bit allocation optimization in accordance with an aspect of the disclosed subject matter.

FIG. 12 illustrates a method 1200 that facilitates endurable view synthesis distortion (EVSD) based bit allocation optimization in accordance with an aspect of the disclosed subject matter. At 1202, method 1200 can encode a current macroblock (MB) with a quantization parameter (QP). For example, a current macroblock can be encoded with an initial quantization parameter of a current segment (e.g., current slice) of a depth frame.

At 1204, it can be determined whether a coded block patter (CBP) is equal to zero. If yes, method 1200 can proceed to 1220. For example, if the coded block pattern of a selected mode equals to zero (e.g., bit rate cannot be reduced), the coding process can end. If no, method 1200 can proceed to 1206.

At 1206, a first distortion value (D1) can be calculated. For example, a VSD($D_{r1}$) caused by the depth distortion of the current macroblock can be determined by employing Eq. 33.

At 1208, the quantization parameter can be increased by step N. At 1210, the current macroblock can be encoded with a selected mode and a new quantization parameter. For example, the current macroblock can be re-encoded with a selected mode (e.g., a mode with a lowest distortion value) and a new quantization parameter. At 1212, a second distortion value (D2) can be calculated.

At 1214, it can be determined whether the second distortion value is greater than the first distortion value. For example, it can be determined whether a previous coding quantization parameter provides a mode with less distortion than a current coding quantization parameter. If yes, method 1200 can proceed to 1216. If no, method 1200 can proceed to 1218.

At 1216, last selected mode coding information can be loaded. For example, coding information for a last selected mode that provides a lowest distortion value (e.g., first distortion value D1) can be loaded. Then, method 1200 can proceed to 1222.

At 1218, it can be determined whether the coded block pattern is equal to zero or whether the quantization parameter is equal to a maximum quantization parameter. If no, method 1200 can return to 1208. If yes, method 1200 can proceed to 1220. For example, the quantization parameter can be further increased and the current macroblock can be re-encoded until all residual values are zero (e.g., coded block pattern is equal to zero) or the quantization parameter reaches a predetermined maximum value.

At 1220, current selected mode coding information can be stored. For example, coding information for the current selected mode that provides the lowest distortion value (e.g., second distortion value D2) can be stored.

At 1222, a bitstream can be written and the current macroblock encoding can end. For example, a bitstream can be written based on the coding information for the selected mode that provides a lowest distortion value. Furthermore, the coding process can end after the current macroblock is encoded based on the selected mode that provides the lowest distortion value.

Figure 13:
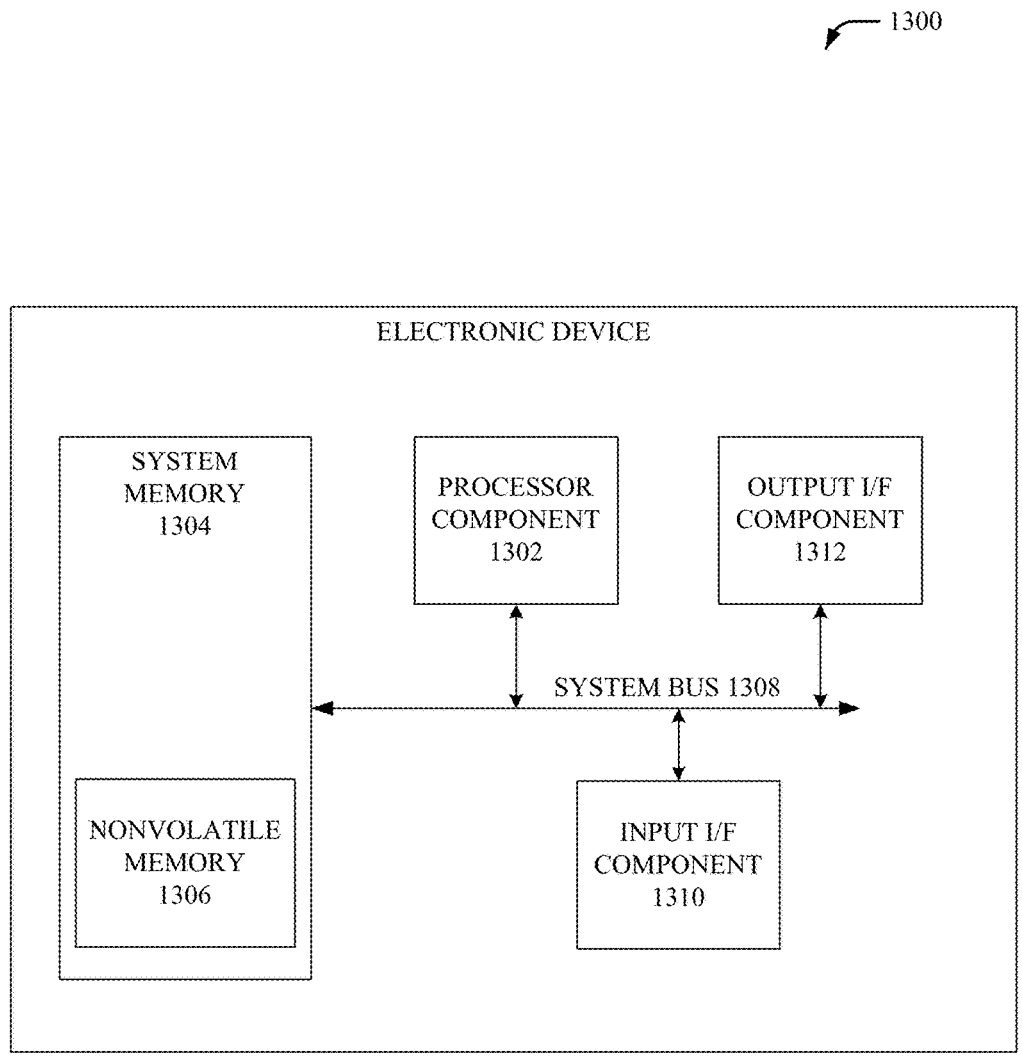
FIG. 13 illustrates a block diagram of an exemplary electronic device that can facilitate depth video coding using EVSD in accordance with an aspect of the disclosed subject matter.

Referring to FIG. 13, illustrated is a block diagram of an exemplary, non-limiting electronic device 1300 that can facilitate depth coding in accordance with an aspect of the disclosed subject matter. The electronic device 1300 can include, but is not limited to, a computer, a server, a laptop computer, a server, a dedicated spatial processing component or device, or network equipment (e.g. routers, access points, femtocells, picocells), and the like.

Components of the electronic device 1300 can include, but are not limited to, a processor component 1302, a system memory 1304 (with nonvolatile memory 1306), and a system bus 1308 that can couple various system components including the system memory 1304 to the processor component 1302. The system bus 1308 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1304 can include computer-readable storage media in the form of volatile and/or nonvolatile memory 1306. A basic inputoutput system (BIOS), containing the basic routines that help to transfer information between elements within electronic device 1300, such as during start-up, can be stored in memory 1304. Memory 1304 can typically contain data and/or program modules that can be immediately accessible to and/or presently be operated on by processor component 1302. By way of example, and not limitation, system memory 1304 can also include an operating system, application programs, other program modules, and program data. As a further example, system memory can include program modules for subchannel assignment and allocation of power as disclosed hereinabove. In some embodiments memory 1304 can store an endurable view synthesis distortion (EVSD) model, input parameters associated with at least one image capturing device and/or view synthesis information, results of computations performed based on EVSD, performance metrics for encoded depth information and/or decoded depth information, other results pertaining to multiview video coding (e.g., depth coding) based on an EVSD model, etc. As an example, an EVSD model can be stored in memory 1304. These exemplary models, parameters, and values can be employed in coding multiview depth video content in accordance with the presently disclosed subject matter.

The nonvolatile memory 1306 can be removable or non-removable. For example, the nonvolatile memory 1306 can be in the form of a removable memory card or a USB flash drive. In accordance with one aspect, the nonvolatile memory 1306 can include flash memory (e.g., single-bit flash memory, multi-bit flash memory), ROM, PROM, EPROM, EEPROM, and/or NVRAM (e.g., FeRAM), or a combination thereof, for example. Further, the flash memory can be comprised of NOR flash memory and/or NAND flash memory.

A user can enter commands and information into the electronic device 1300 through input devices (not illustrated) such as a keypad, microphone, tablet or touch screen although other input devices can also be utilized. These and other input devices can be connected to the processor component 1302 through input interface component 1310 that can be connected to the system bus 1308. Other interface and bus structures, such as a parallel port, game port or a universal serial bus (USB) can also be utilized. A graphics subsystem (not illustrated) can also be connected to the system bus 1308. A display device (not illustrated) can be also connected to the system bus 1308 via an interface, such as output interface component 1312, which can in turn communicate with video memory. In addition to a display, the electronic device 1300 can also include other peripheral output devices such as speakers (not illustrated), which can be connected through output interface component 1312. In an aspect, other electronic devices, e.g., terminal devices can be communicatively coupled to electronic device 1300 by way of input interface component 1310 and output interface component 1312, which can serve to facilitate transfer of transcoded content streams.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description may have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those implicating physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim. Moreover, the term "or" is intended to be an "inclusive or" and not an "exclusive or", unless otherwise indicated.

What is claimed is:

1. A system, comprising:
    a memory to store at least one computer-executable component; and
    a processor, communicatively coupled to the memory, to execute or facilitate execution of the at least one computer-executable component, the at least one computer-executable component comprising:
        a distortion estimator component that receives at least one parameter associated with at least one image capturing device and generates a distortion value based on the at least one parameter; and
        an encoder component that encodes a multiview input stream based at least in part on the distortion value and data indicative of a piecewise relationship between depth error and rendering position error, wherein the encoder component determines a mode for coding a macroblock of the multiview input stream based on the distortion value generated based on the at least one parameter associated with the at least one image capturing device, and/or wherein the encoder component determines a number of bits for the macroblock of the multiview input stream and adjusts a coding quantization parameter for the macroblock during a bit allocation process based on the distortion value generated based on the at least one parameter associated with the at least one image capturing device.

2. The system of claim 1, wherein the mode is a first mode, and wherein the encoder component re-encodes the macroblock based on a second mode for coding that is determined based on the distortion value.

3. The system of claim 2, wherein the encoder component is a moving picture experts group codec, an H.264/advanced video coding codec or a high efficiency video coding codec.

4. The system of claim 1, wherein the multiview input stream comprises a plurality of views of a scene facilitating a determination of depth information for an object in the scene.

5. The system of claim 1, wherein the at least one parameter is associated with view synthesis information indicative of at least a focal length value associated with the at least one image capturing device.

6. The system of claim 1, wherein the at least one parameter comprises a focal length value for the at least one image capturing device, and the encoder component determines the number of bits for the macroblock and adjusts the coding quantization parameter for the macroblock during the bit allocation process based on the focal length value for the at least one image capturing device.

7. The system of claim 1, wherein the at least one parameter comprises a baseline distance value associated with the at least one image capturing device and a virtual image capturing device.

8. The system of claim 1, wherein the at least one parameter comprises depth information associated with the multiview input stream.

9. The system of claim 1, wherein the macroblock is included in a depth frame of the multiview input stream.

10. The system of claim 1, wherein the encoder component selects the mode from a set of defined modes for depth coding based at least in part on the distortion value.

11. The system of claim 1, wherein the encoder component determines a motion vector for depth coding based at least in part on the distortion value.

12. The system of claim 1, wherein the encoder component determines a reference frame for depth coding based at least in part on the distortion value.

13. The system of claim 1, wherein the distortion estimator component generates the distortion value for a particular quantized depth level and another distortion value for another quantized depth level.

14. A method, comprising:
    receiving, by a system comprising a processor, an encoder facilitating encoding of a multiview input stream;
    receiving, by the system, a distortion value generated based on at least one parameter associated with at least one image capturing device; and
    encoding, by the system, the multiview input stream based at least in part on the distortion value, the encoder, and data indicative of a mapping between depth error and rendering position error, comprising determining a mode for coding a macroblock of the mutliview input stream based on the distortion value generated based on the at least one parameter associated with the at least one image capturing device, or performing a bit allocation process by allocating a defined number of bits to the macroblock of the multiview input stream and modifying an encoding parameter for the macroblock based on the distortion value generated based on the at least one parameter associated with the at least one image capturing device.

15. The method of claim 14, further comprising:
    receiving, by the system, the multiview input stream comprising receiving a plurality of views of a scene facilitating determination of depth information for an object in the scene.

16. The method of claim 14, wherein the modifying the encoding parameter for the macroblock comprises increasing a value of the encoding parameter.

17. The method of claim 14, wherein the determining the mode comprises determining the mode for depth coding based at least in part on the distortion value.

18. The method of claim 14, further comprising:
    decoding, by the system, the encoded multiview input stream based at least in part on the distortion value.

19. A computer-readable storage device comprising executable instructions that, in response to execution, cause a system comprising a processor to perform operations, comprising:
    receiving an encoder facilitating encoding of a multiview input stream;
    receiving a distortion value generated based on at least one parameter associated with at least one image capturing device; and
    encoding, using the encoder, the multiview input stream based at least in part on the distortion value and data indicative of a relation between depth error and rendering position error, comprising determining a mode for depth coding for a group of pixels included in the multiview input stream based on the distortion value generated based on the at least one parameter associated with the at least one image capturing device, or determining a number of bits for the group of pixels included in the multiview input stream and altering a coding quantization parameter for the group of pixels during a bit allocation stage based on the distortion value generated based on the at least one parameter associated with the at least one image capturing device.

20. The computer-readable storage device of claim 19, wherein the encoding comprises:
allocating the number of bits to a macroblock of at least one depth frame included in the multiview input stream during the bit allocation stage based at least in part on the distortion value.

* * * * *